United States Patent
Verspecht et al.

(10) Patent No.: US 10,003,419 B1
(45) Date of Patent: Jun. 19, 2018

(54) METHOD AND SYSTEM OF PREVENTING INTERFERENCE CAUSED BY IMAGES

(71) Applicant: Keysight Technologies, Inc., Minneapolis, MN (US)

(72) Inventors: Jan Verspecht, Londerzeel (BE); Jean-Pierre Teyssier, Santa Rosa, CA (US); Troels Studsgaard Nielsen, Aalborg (DK)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days. days.

(21) Appl. No.: 15/609,098

(22) Filed: May 31, 2017

(51) Int. Cl.
- *H04B 17/00* (2015.01)
- *H04B 17/29* (2015.01)
- *H04B 15/00* (2006.01)

(52) U.S. Cl.
CPC ........... *H04B 17/29* (2015.01); *H04B 15/005* (2013.01)

(58) Field of Classification Search
CPC ... H04B 17/0085; H04B 17/29; H04B 15/005
See application file for complete search history.

(56) References Cited

U.S. PATENT DOCUMENTS

| | | |
|---|---|---|
| 8,185,078 B2 | 5/2012 | Martens et al. |
| 8,744,021 B1 | 6/2014 | Gurney et al. |
| 8,841,923 B1 | 9/2014 | Vanwiggeren |
| 9,252,895 B1 * | 2/2016 | Verspecht ............. H04B 17/29 |
| 9,459,295 B2 | 10/2016 | Wertz |
| 2009/0061812 A1 | 3/2009 | VanWiggeren et al. |
| 2012/0254274 A1 * | 10/2012 | Padaki .................. G06F 17/144 |
| | | 708/405 |
| 2017/0111127 A1 | 4/2017 | Vanwiggeren et al. |

* cited by examiner

*Primary Examiner* — Tuan Pham

(57) ABSTRACT

A system and method prevent interference caused by images resulting from mixing an incoming periodically modulated RF signal with multiple LO signals generated by a LO in a receiver system. The method includes determining tone frequencies of multiple tones and determining tone spacing between adjacent tones in the periodically modulated RF signal using a known period of modulation of the periodically modulated RF signal; identifying a sampling rate of an ADC of the receiver system; determining a DFT record size of samples provided by the ADC based on at least the tone spacing and the ADC sampling rate; and determining LO frequencies of the multiple LO signals based on at least the DFT record size and the ADC sampling rate, such that images created by respectively mixing the determined LO frequencies with portions of the periodically modulated RF signal avoid interfering with direct mixing components of the plurality of tones.

18 Claims, 4 Drawing Sheets

US 10,003,419 B1

METHOD AND SYSTEM OF PREVENTING INTERFERENCE CAUSED BY IMAGES

BACKGROUND

A number of systems and techniques are employed to receive and measure various characteristics of a device under test (DUT) using periodically modulated radio frequency (RF) signals output by the DUT, typically in response to an excitation signal. However, it is difficult to perform accurate and complete measurements of broadband periodically modulated RF signals using a conventional mixer-based receiver, as the difference between the minimum and maximum frequencies of the periodically modulated RF signal (referred to as "total bandwidth") exceeds the intermediate frequency (IF) bandwidth of the receiver (referred to as "IF bandwidth"). The IF bandwidth of a receiver is the bandwidth over which a vector network analyzer (VNA), for example, is able to measure both amplitude and phase of the periodically modulated RF signal.

For example, because of spectral regrowth, the total bandwidth of a broadband periodically modulated RF signal may easily exceed 300 MHz, whereas a standard IF bandwidth of a conventional VNA is only about 40 MHz. Because of the limited IF bandwidth, at least eight local oscillator (LO) frequency settings are needed (e.g., for receiving the 300 MHz total bandwidth in eight 40 MHz bandwidth portions), along with eight corresponding analog-to-digital converter (ADC) data record acquisitions, in order to capture the spectrum between the lowest and highest frequencies of the total bandwidth.

Use of periodically modulated RF signals, which include multiple tones, are commonly used for characterization and validation of various types of DUTs, such as power amplifiers. These signals may be created by repeating IQ-sequences on vector signal generator, for example. However, when the periodically modulated RF signals are mixed with local oscillator (LO) frequencies in a conventional receiver to frequency convert to corresponding IF frequencies, the mixing products of the resulting IF signals include the actual tones at the same tone spacings as the periodically modulated RF signals, as well as unwanted images, such as harmonics and alias components. Images particularly result from high-side mixing, where the LO frequency is higher than the carrier frequency of the periodic modulated signal (by the IF bandwidth). The images create interference and otherwise add noise to the IF signal. Conventional superheterodyne receivers include specific filters for the purpose of image rejection. However, VNAs and other types of receiver systems, such as Performance Network Analyzers (PNAs), available from Keysight Technologies, Inc., and network analyzers (NAs) do not include such filters. Further, the problem with mixing products generating images is exacerbated when broadband periodically modulated RF signals are involved since multiple frequency conversions using multiple LO frequencies are performed.

BRIEF DESCRIPTION OF THE DRAWINGS

The representative embodiments are best understood from the following detailed description when read with the accompanying drawing figures. Wherever applicable and practical, like reference numerals refer to like elements.

DETAILED DESCRIPTION

Figure 1:
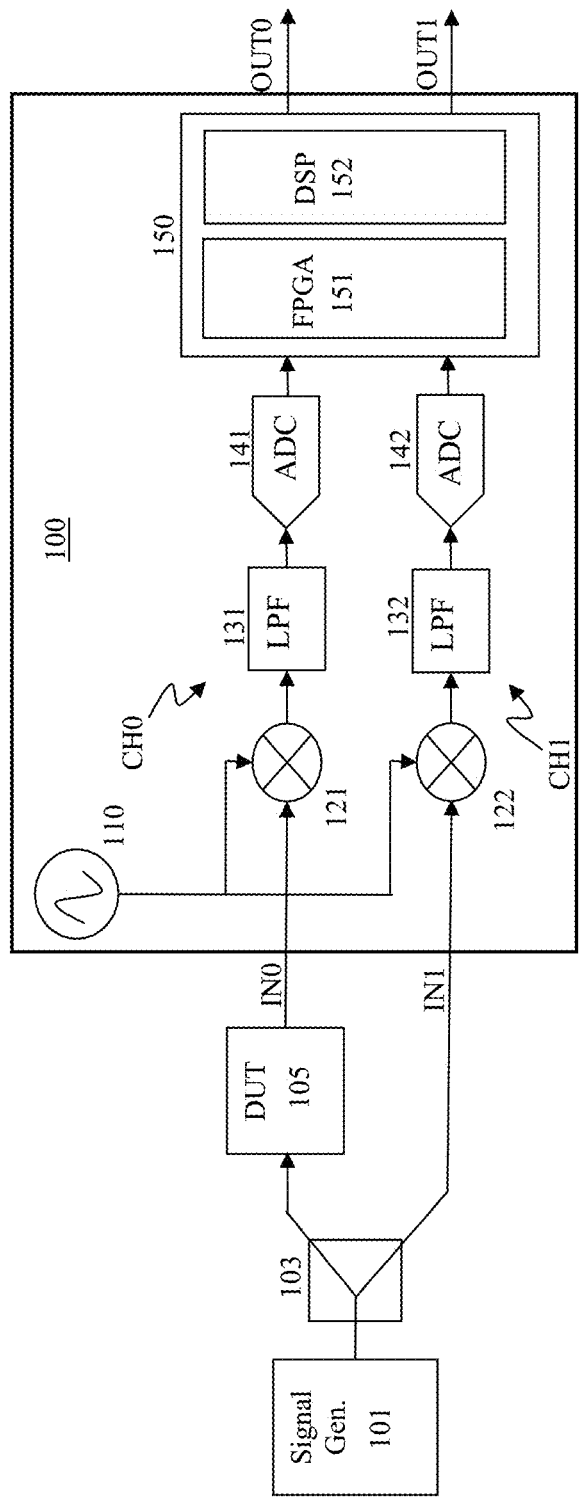
FIG. 1 is a simplified block diagram of a receiver system for determining local oscillator (LO) frequencies of LO signals and for measuring a full spectrum of a periodically modulated RF signal output by a device under test (DUT) using the determined LO frequencies, to substantially prevent interference caused by images resulting from mixing the LO signals and portions of the periodically modulated RF signal, according to a representative embodiment.

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings.

Generally, it is understood that as used in the specification and appended claims, the terms "a", "an" and "the" include both singular and plural referents, unless the context clearly dictates otherwise. Thus, for example, "a device" includes one device and plural devices.

As used in the specification and appended claims, and in addition to their ordinary meanings, the terms "substantial" or "substantially" mean to within acceptable limits or degree. For example, "substantially cancelled" means that one skilled in the art would consider the cancellation to be acceptable. As a further example, "substantially removed" means that one skilled in the art would consider the removal to be acceptable.

As used in the specification and the appended claims and in addition to its ordinary meaning, the term "approximately" means to within an acceptable limit or amount to one having ordinary skill in the art. For example, "approximately the same" means that one of ordinary skill in the art would consider the items being compared to be the same.

In accordance with various embodiments discussed herein, radio frequency (RF) signal measurement systems, such as Performance Network Analyzers (PNAs) and Vector Network Analyzers (VNAs), for example, are able to perform accurate and fast measurements of characteristics and behavior of an active device under test (DUT) excited by periodically modulated RF signals or carriers. The periodically modulated RF signals may be broadband periodically modulated RF signals, in which the difference between the minimum and maximum frequencies (referred to as "total bandwidth") exceeds an intermediate frequency (IF) bandwidth of the measurement instrument (referred to as "IF bandwidth"). For the sake of convenience, the term "periodically modulated RF signal," as used herein, is intended to cover both broadband and non-broadband RF signals.

As mentioned above, the use of periodically modulated RF signals is a common practice for the characterization and validation of amplifiers, for example. These signals are typically created by repeating IQ-sequences on vector signal generators (VSAs) or arbitrary wave generators (AWGs). The periodicity of the modulation is important as it enables use of an advanced digital signal processor (DSP) to achieve unprecedented dynamic range through coherent averaging, as well as unprecedented modulation bandwidth through spectral stitching. For example, the various embodiments of the present disclosure may enable measurement of 2 GHz of modulation bandwidth with 1 kHz tone spacing, which corresponds to 2 million tones. Once measured, the signal data may be represented in the frequency domain, as done in a spectrum analyzer (SA), or in the envelope domain, as done in a vector signal analyzer (VSA). Because of vector network analyzer (VNA) architecture, not only is the transmitted signal measured, but the incident and reflected signals may also be measured. According to various additional embodiments, phase coherent multichannel measurements of periodically modulated RF signals may be performed. Such capabilities enable reliable measurement of RF signals for characterizing power amplifier design and validation, for example, in aerospace and defense (A/D) systems, as well as 4G and 5G wireless telecommunication systems.

According to various embodiments, a method and a system are provided for preventing or minimizing interference caused by images resulting from mixing an incoming periodically modulated RF signal with multiple LO signals generated by an LO in a receiver system, such as a PNA or a VNA, for example. The method includes determining tone frequencies of multiple tones and determining tone spacing between adjacent tones of the multiple tones in the periodically modulated RF signal using a known period of modulation; identifying a sampling rate of an analog to digital converter (ADC) of the receiver system; determining a discrete Fourier transform (DFT) record size of samples provided by the ADC based on at least the tone spacing and the ADC sampling rate; and determining LO frequencies of the multiple LO signals based on at least the DFT record size and the ADC sampling rate, such that images created by respectively mixing the determined LO frequencies with portions of subsequently received periodically modulated RF signal substantially avoid interfering with direct mixing components of the multiple tones.

FIG. 1 is a simplified block diagram of a receiver system for determining LO frequencies of LO signals and for measuring a full spectrum of a periodically modulated RF signal output by a DUT using the determined LO frequencies, to substantially prevent interference caused by images resulting from mixing the LO signals and the periodically modulated RF signal, according to a representative embodiment.

The discussion below assumes that the periodically modulated RF signal is a broadband signal that cannot be received using a single LO frequency, since the total bandwidth of the periodically modulated RF signal exceeds the IF bandwidth of the receiver system. Accordingly, multiple LO signals with corresponding multiple LO frequencies are applied to portions of the broadband periodically modulated RF signal (that is, bandwidth portions of the total bandwidth that are within the IF bandwidth) to enable the receiver system to receive and measure the broadband periodically modulated RF signal one portion at a time. These received and measured portions ultimately may be stitched together to provide data across the total bandwidth of the periodically modulated RF signal once all of the data has been systematically collected.

Referring to FIG. 1, receiver system 100 may be any of various types of signal measurement instruments, such as a network analyzer (NA), a vector network analyzer (VNA), or a Performance Network Analyzer (PNA), for example. In the depicted embodiment, the receiver system 100 is a multi-channel system that includes two phase coherent channels CH0 and CH1, for purposes of illustration. It is understood that the embodiments described herein are likewise applicable to single channel systems, as well as to systems have fewer or more than two channels, without departing from the scope of the present teachings. The channels CH0 and CH1 have corresponding input ports IN0 and IN1 and output ports OUT0 and OUT1, respectively. Generally, the different channels of the receiver system 100 may be used to measure different signals associated with an experiment, such as an input signal to DUT 105, an output signal of the DUT 105, and/or incident and reflected waves at the input and output ports of the DUT 105. For DUTs having multiple output ports, the corresponding output signals of the DUT may be measured using the different channels, as well.

The receiver system 100 further includes a common sinusoidal LO 110 that is tunable to provide LO signals having different LO frequencies, the values of which are determined by a digital signal processor (DSP) 152 in processing unit 150, as discussed below. The receiver system 100 also includes first and second mixers 121 and 122, first and second low pass filters (LPFs) 131 and 132, and first and analog to digital converters (ADCs) 141 and 142, arranged in the first and second channels CH0 and CH1, respectively. As shown, each of the first and second mixers 121 and 122 receives the same LO signal through an LO port and an input signal (e.g., a portion of the periodically modulated RF signal or "RF input signal") from the corresponding input ports IN0 and IN1, respectively, through an RF port, and outputs an intermediate frequency (IF) signal through an IF port.

The IF signal is the result of mixing the LO signal and periodically modulated RF signal. In the depicted embodiment, the RF input signal in the first channel CH0 is the periodically modulated RF signal output by the DUT 105 (which may be referred to as the "response signal") in response to the periodically modulated RF signal generated by the signal generator 101 (which may be referred to as the "excitation signal"). The RF input signal in the second channel CH1 is the periodically modulated RF signal itself, generated by the signal generator 101. The signal generator 101 may be an external signal generator, such as a vector signal generator (VSG) or an arbitrary waveform generator (AWG), for example, although any signal generator capable of providing a periodically modulated RF signal may be incorporated without departing from the scope of the present teachings. In the depicted embodiment, the receiver system 100 includes a splitter 103 that divides the periodically modulated RF signal generated by the signal generator 101, resulting in the excitation signal input to the DUT 105 (which outputs the RF input signal provided to the first channel CH0, in response) and the RF input signal provided to the second channel CH1, respectively. The DUT 105 is shown as a two-port active device, such as a power amplifier, for example, although other types of DUTs may be incorporated without departing from the scope of the present teachings.

In the depicted embodiment, the processing unit 150 includes a field-programmable gate array (FPGA) and the DSP 152, although various combinations of processing device(s) may be incorporated without departing from the scope of the present teachings. For example, the processing unit 150 may be implemented by a computer processor, FPGAs, application specific integrated circuits (ASICs), or combinations thereof, using software, firmware, hard-wired logic circuits, or combinations thereof. A computer processor, in particular, may be constructed of any combination of hardware, firmware or software architectures, and may include its own memory or memory device (e.g., nonvolatile memory) for storing executable software/firmware executable code that allows it to perform the various functions. In an embodiment, the computer processor may comprise a central processing unit (CPU), for example, executing an operating system. The memory devices constitute non-transient computer-readable mediums. Of course, other types of processors and computing devices, including personal computers, either internal to or external from the receiver system 100, may be incorporated, without departing from the scope of the present teachings.

The processing unit 150 may also include memory for storage of data, applications and other information. The memory may include a variety of non-transient computer-readable mediums suitable for use with the disclosed system, including, for example, solid state storage devices, magnetic storage devices and optical storage devices. For example, memory may be implemented by any number, type and combination of random access memory (RAM) and/or read-only memory (ROM), which may include any number, type and combination of computer readable storage media, such as a disk drive, an electrically programmable read-only memory (EPROM), an electrically erasable and programmable read only memory (EEPROM), a CD, a DVD, a universal serial bus (USB) drive, and the like, which are non-transitory (e.g., as compared to transitory propagating signals).

As mentioned above, the LO frequencies of the LO signals provided by the LO 110 are initially determined by the DSP 152, such that unwanted images (e.g., harmonics and alias components) generated by mixing the LO signals with the portions of the periodically modulated RF signal by the first and second mixers 121 and 122, respectively, are substantially eliminated. Generally, digitized signal data from the first and second channels CH0 and CH1 are provided to the DSP 152, and converted from the time domain to the frequency domain (e.g., using discrete Fourier transforms (DFTs)) to provide frequency domain records comprising multiple frequency bins (e.g., DFT bins). The LO frequencies of the LO 110 are determined by the DSP 152 such that tones of (subsequently received) periodically modulated RF signals correspond to one set of frequency bins (e.g., first DFT bins), while images caused by mixing the LO signals with the portions of the periodically modulated RF correspond to another set of frequency bins (e.g., second DFT bins). For the received RF input signals, the first DFT bins can be selected and the second DFT bins can be discarded in order to substantially eliminate the images from signal data output by the processing unit 150. The process of determining the LO frequencies is discussed further, below.

When receiving and mixing the portions of the periodically modulated RF signal with the LO signal, the first mixer 121 outputs an IF signal, which is filtered by the first LPF 131 to filter out high frequency signals, digitized by the first ADC 141 and input to the processing unit 150 for processing the digital signal data. The processing includes selecting frequency bins to which the tones of the periodically modulated RF signals correspond, and discarding frequency bins to which the images correspond, as mentioned above. Likewise, referring to the other coherent channel, the IF signal output by the second mixer 122 is filtered by the second LPF 132, digitized by the second ADC 142 and input to the processing unit 150. The processing unit 150 may also perform spectral stitching of the selected frequency bins for each of the first and second channels CH0 and CH1 resulting from mixing with other LO frequencies. The spectrally stitched signal data from one or more of the first and second output ports OUT0 and OUT1 may be displayed on a display unit (not shown).

Any periodically modulated RF signal may be represented by a discrete spectrum. In other words, the periodically modulated RF signal includes multiple tones (i.e., multi-tone) that are described by a set of discrete frequencies and associated complex phasors. Each complex phasor may be represented by a real part and an imaginary part, or equivalently by phase and amplitude. For purposes of discussion herein, there will be no conceptual distinction made between a "tone" and a "phasor." Considering the fact that parasitic harmonics are present, the frequencies of the tones present in the excitation periodically modulated RF signal ("excitation signal") generated by the signal generator 101 may represented by Equation (1):

$$f[h,i]=h \cdot f_C + i \cdot f_{MOD} \qquad (1)$$

Referring to Equation (1), $f_C$ is the carrier frequency of the periodically modulated RF signal generated by the signal generator 101, $f_{MOD}$ is the modulation tone spacing (which equals the reciprocal of the repetition period of the modulation), h represents the positive harmonic index, and i represents the positive or negative modulation index. For purposes of illustration, a single sided representation of spectra is considered, meaning that only positive frequencies will be considered. Such consideration may be less elegant from a mathematical point of view, but more practical from an engineering point of view.

The output periodically modulated RF signal ("response signal") of the 2-port DUT 105, which is input to the receiver system 100, will also be represented by a discrete spectrum with the same tone spacing $f_{MOD}$ as the excitation signal. The response signal will most likely contain harmonics as well as spectral regrowth. Because of the spectral regrowth, the range of the modulation indices for the response signal is typically a multiple of the range of indices for the excitation signal. It is therefore desirable to efficiently and accurately measure the fundamental phasors, corresponding to all frequencies described by Equation (1), with h=1.

Referring again to the receiver system 100 in FIG. 1, the periodically modulated RF signal (i.e., the response signal or the RF input signal) received by the receiver system 100 is directed through the first and second input ports IN0 and IN1 to the RF inputs of the first and second mixers 121 and 122, which are driven by the common LO 110, as discussed above. The mixers 121 and 122 may be odd harmonic mixers based on Gilbert-cells or diodes, for example. Inside each of the first and second mixers 121 and 122, the sinusoidal LO signal is turned into a square wave with very sharp edges, with a transition time of about 5 ps, for example. This square wave is then multiplied with the RF input signal. As a result of squaring up the LO signal, the RF input signal will not only mix with the fundamental frequency of the LO signal, but also with all odd harmonics. Because of non-idealities inside each of the first and second mixers 121 and 122, even harmonics will also be present, which can be regarded as a parasitic, yet measurable, effect.

The IF outputs are filtered by the first and second LPFs 131 and 132 and digitized by the first and second ADCs 141 and 142 in the receiver system 100. The first and second LPFs 131 and 132 may be low pass anti-alias filters, for example. Each of these low pass anti-alias filters may be a broadband solution, having a cut-off frequency of about 38 MHz, or a narrowband solution, having a cut-off frequency of about 11 MHz, for example. Each of the first and second ADCs 141 and 142 has the same sampling rate for sampling the filtered signal data. In an embodiment, the ADC sampling rate may be about 100 MHz, for example. The filtered and digitized samples are processed by the FPGA 151, as well as by software running on the DSP 152, of the processing unit 150. This results in two digital data outputs (e.g., measuring different parameters) from the first and second output ports OUT0 and OUT1, typically in the frequency domain. The digital data outputs may be further processed by a display processor (not shown) for presentation on a display device (not shown), as mentioned above.

In an embodiment, the LO 110, the first and second ADCs 141 and 142, and the processing unit 150 are synchronized though a common clock (not shown), which may provide a 100 MHz clock signal, for example. The signal generator 101 is also synchronized with the common clock. This may be achieved through distribution of a common 10 MHz reference clock signal, for example, as would be apparent to one skilled in the art. The lowest frequency and the highest frequency of each IF signal that can measured, as a practical matter, are referred to as $f_{MIN}$ and $f_{MAX}$, respectively.

The structure of the receiver system 100 is representative of a "low-IF receiver." In contrast to a conventional superheterodyne receiver, no filter is present in the receiver system 100 for the purpose of image rejection. Accordingly, image rejection needs to be performed by digital means, such as the processing unit 150. A low-IF receiver is common in a VNA, for example, although image rejection is basically not an issue for a VNA application since only one tone is typically applied at a time. In contrast, according to the various embodiments discussed herein, digital image rejection may be achieved using the receiver system 100 even when applying periodically modulated RF signals with multiple tones.

As previously mentioned, the first and second ADCs 141 and 142 and the processing unit 150 share the same (100 MHz) sampling clock signal. As a result, the first and second channels CH0 and CH1 are automatically measured in a phase coherent manner. Therefore, in the discussion below, it will be sufficient to explain operation of the receiver system 100 referring to only one channel (e.g., the first channel CH0), for the sake of convenience, while it is understood that the discussion applies equally to the other channel(s), as well. The process focuses on calculating a DFT record size, a set of DFT bins and a set of LO frequencies that will enable measurement of the tones of interest, while discarding the images.

Figure 2:
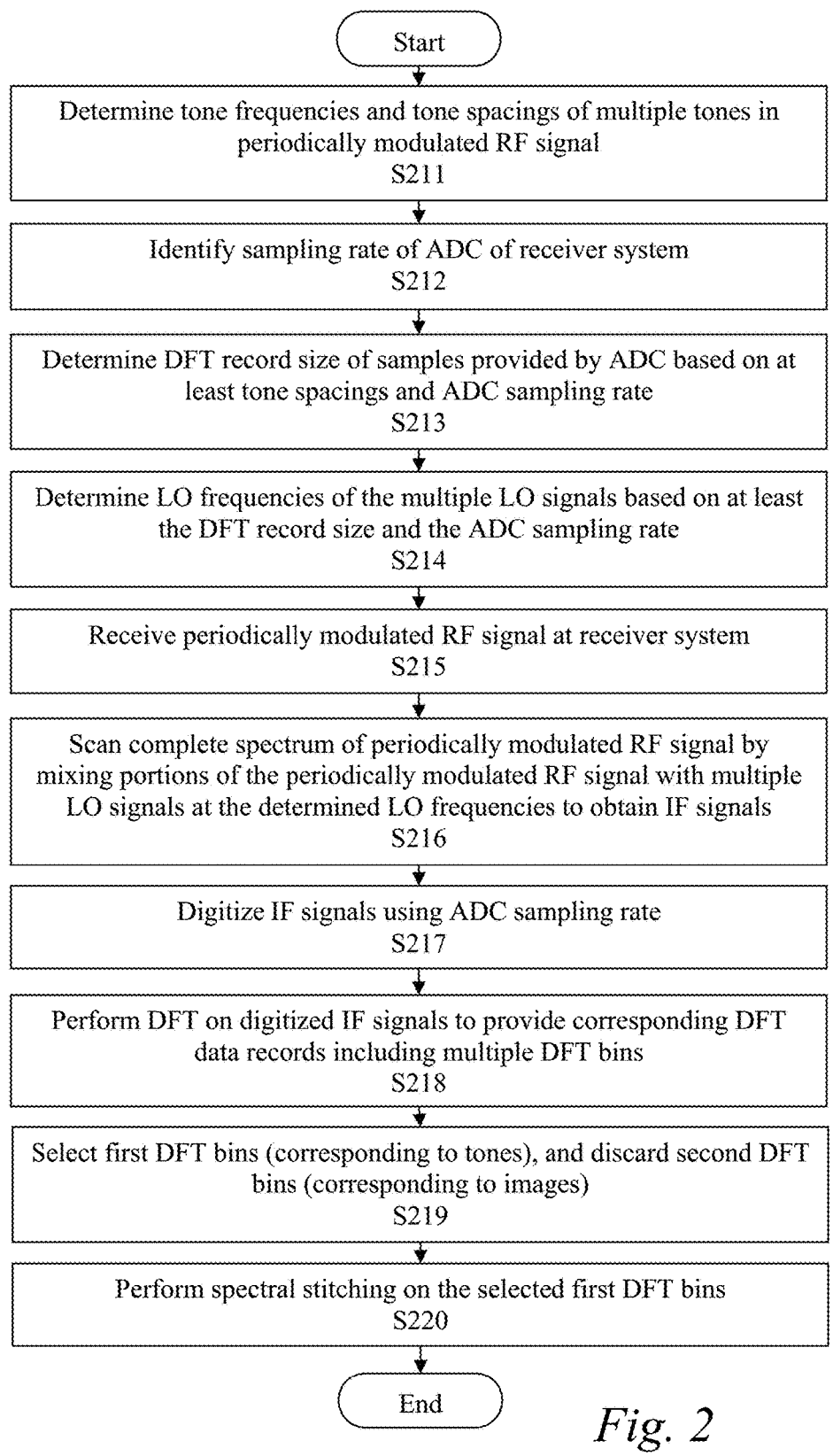
FIG. 2 is a flow diagram showing a method for preventing interference caused by images resulting from mixing an incoming periodically modulated RF signal output by a DUT with LO signals generated by an LO in a receiver system, such as a network analyzer, a vector network analyzer or a performance network analyzer, in order to measure a full spectrum of the periodically modulated RF signal, according to a representative embodiment.

FIG. 2 is a flow diagram showing a method for preventing interference caused by images resulting from mixing an incoming periodically modulated RF signal output by a DUT with LO signals generated by an LO in a receiver system, such as a network analyzer, a vector network analyzer or a performance network analyzer, in order to measure a full spectrum of the periodically modulated RF signal, according to a representative embodiment. As mentioned above, the method will be described with reference to one channel of a multi-channel receiver system, for the sake of convenience. It is understood, however, that the description applies to any additional channels, as well. Further, the method may be practically divided into two processes, for the sake of convenience. That is, blocks S211 to S214 are generally directed to determining DFT record size and LO frequencies, and blocks S215 to S220 are generally directed to receiving and processing periodically modulated signals using the determined DFT record size and LO frequencies.

Referring to FIG. 2, tone frequencies of multiple tones and tone spacing between adjacent tones of the multiple tones in the periodically modulated RF signal are determined in block S211. The tone frequencies and tone spaces are determined using a priori information regarding a period of modulation of the periodically modulated RF signal. The tone spacing, in particular, is determined to make advantageous use of the DFT, so that tones of the periodically modulated RF signal will correspond to DFT bins (i.e., first DFT bins), as discussed below. The tone frequencies and tone spacing may be programmed into the signal generator 101 to provide the periodically modulated RF signal input to the DUT (105).

In block S212, a sampling rate of an ADC (141) of the receiver system (100) is identified. The sampling rate is typically fixed with respect to the ADC, and can be identified by user input, read from memory and/or look-up table, or measured. A DFT record size of samples provided by the ADC is determined in block S213 based on at least the tone spacing and the identified ADC sampling rate. In an embodiment, determining the DFT record size may be further based on a desired level of protection from interference caused by the images (i.e., a desired amount of interference reduction). For example, a higher desired level of protection from image interference results in a larger DFT record size, and less interference caused by the images created by the mixing of the determined LO frequencies with the portions of the periodically modulated RF signal. The desired level of protection may be based, in part, on limiting a number of Nyquist zones of the ADC (141) and/or a number of harmonics of the periodically modulated RF signal considered when determining interference by the images resulting from the mixing of the determined LO frequencies with the portions of the periodically modulated RF signal. For example, the more Nyquist zones of the ADC and the more harmonics taken into consideration result in a higher level of protection from image interference. In order to optimize the processing speed, the determined DFT record size may be restricted to have no prime factors other than factors of a predetermined set of prime numbers. For example, if the DFT is based on the Intel Math Kernel Library (MKL) for calculating the DFT record size, the DFT record size will have no prime factors other than 2, 3, 5, 7, 11 and 13.

In block S214, the LO frequencies of the multiple LO signals are determined based on at least the DFT record size, the ADC sampling rate and the tone frequencies, such that images created by respectively mixing the determined LO frequencies with portions of the periodically modulated RF signal substantially avoid interfering with direct mixing components of the multiple tones. That is, the determined LO frequencies result in the direct mixing components of the multiple tones corresponding to a set of first DFT bins, and the images created by mixing the determined LO frequencies with portions of the periodically modulated RF signal corresponding to a set of second DFT bins, which can be discarded. The determined LO frequencies are applied to a mixer (121) for subsequent reception and frequency conversion of portions of the periodically modulated RF signal, as discussed below.

In other words, in order to make advantageous use of the DFT, it must be assured that after the frequency conversion by the mixer, all of the measured tones will correspond to exact DFT bins (i.e., the first DFT bins). Since the frequency conversion preserves the modulation tone spacing of the input RF signal in the IF signal, this can be achieved by using a tone spacing ($f_{MOD}$) that is equal to a rational number times the ADC sampling rate ($f_{ADC}$), as shown by Equation (2):

$$f_{MOD} = \frac{K}{L} f_{ADC} \qquad (2)$$

In Equation (2), K and L form a pair of integers that are prime relative to one another ("relatively prime"). Therefore, in order for the DFT bins to be compatible with the tone spacing, it is sufficient for the DFT record size R to be a multiple of L, as expressed by Equation (3):

$$R = FL \qquad (3)$$

In Equation (3), F is an integer referred to as the "oversampling factor," which represents a number of additional DFT bins provided in each DFT data record. Generally, the greater the oversampling factor (and thus the larger the DFT data record), the greater the level of protection from interference caused by images.

The corresponding DFT frequency resolution ($f_{RES}$) is given by Equation (4):

$$f_{RES} = \frac{f_{ADC}}{R} = \frac{f_{ADC}}{FL} \qquad (4)$$

The relationship between the tone spacing ($f_{MOD}$) and the DFT frequency resolution ($f_{RES}$) is given by Equation (5):

$$f_{MOD} = \frac{K}{L} f_{ADC} = \frac{K}{L} (FL f_{RES}) = KF f_{RES} \qquad (5)$$

As indicated by Equations (3) to (5), the relationship between the tone spacing $f_{MOD}$ and the DFT record size R are tightly coupled. If either the tone spacing $f_{MOD}$ or the DFT record size R is fixed in value, the other value is likewise restricted. Notably, this relationship can go both ways for determining LO frequencies. That is, one may choose a tone spacing and determine the matching DFT record size suitable for providing the desired level of protection from image interference, or one may choose a DFT record size suitable for providing the desired level of protection from image interference and determine the associated tone spacing of the periodically modulated RF signal.

FIG. 2 depicts the former method (choosing tone spacing and determining DFT record size). However, FIG. 2 would apply equally to the latter method by switching these steps, such that the suitable DFT record size is first determined based on the ADC sampling rate and a required minimum tone spacing, and then the actual tone spacing is determined based on the suitable DFT record size. Notably, using this latter method, the calculated (actual) tone spacing will be smaller than a specified tone spacing, which may be advantageous from the perspective of data processing and image rejection. In either case, the DFT record size for providing the desired level of protection from image interference is generally influenced by the values of F, K and L, such that the DFT record size $R = FL$, $f_{mod} = K/L * f_{adc}$, and the value of K should be as high as possible. Also, K and L are relatively prime, while F and L should not have prime factors other than the ones determined by the microprocessor.

In determining the LO frequencies of the multiple LO signals in block S214, an LO frequency is necessarily selected such that the carrier frequency ($f_C$) of the periodic modulated RF signal ends up on a DFT bin, as indicated for example by Equation (6):

$$f_{LO} = f_C - D f_{RES} \qquad (6)$$

Referring to Equation (6), D is assumed to be a positive integer and smaller than the product of K and F. It then is determined what DFT bins correspond to the complete down-converted multi-tone signal. This determination starts with the fundamental tones having frequencies f[1,i], given by Equation (7):

$$f[1,i] = f_C + i f_{MOD} \qquad (7)$$

Equation (8) introduces the notation of Grid[α,β], which denotes the set of numbers defined on a uniform grid, where α represents the grid offset and β represents the grid spacing:

$$\gamma \in \text{Grid}[\alpha,\beta] \Leftrightarrow \gamma = \alpha + M\beta, \text{ with } M \in \mathbb{Z} \qquad (8)$$

A trivial, yet useful, characteristic is provided by Equation (9), where for $P \in \mathbb{Z}$:

$$\text{Grid}[\alpha + P\beta, \beta] = \text{Grid}[\alpha, \beta] \qquad (9)$$

Equation (9) thus implies that the set of grids Grid[α+Pβ,β] forms an equivalency class that can be represented in a unique way by Grid[α mod β, β]. In the following the positive quantity (α mod β) will be called the "grid offset," such that:

$$f[1,i] \in \text{Grid}[f_C, f_{MOD}] \qquad (10)$$

The set of IF frequencies, the frequencies obtained after frequency conversion, will also be on uniform grids, which may be calculated. First, there are the direct mixing products $f_{D,1}[i]$ corresponding to low-side mixing. The direct mixing products $f_{D,1}[i]$ are given by subtracting $f_{LO}$ from the frequencies f[1,i], as shown by Equation (11):

$$f_{D,1}[i] = (f_C + i f_{MOD}) - (f_C - D f_{RES}) = D f_{RES} + i f_{MOD} = (D + iKF) f_{RES} \qquad (11)$$

Or, in other words, the direct mixing products $f_{D,1}[i]$ may be indicated as follows:

$$f_{D,1}[i] \in \text{Grid}[D f_{RES}, KF f_{RES}] \qquad (12)$$

The corresponding DFT bins $b_{D,1}[i]$ are given by dividing the grid by $f_{RES}$, with the following result:

$$b_{D,1}[i] \in \text{Grid}[D, KF] \qquad (13)$$

To simplify the mathematical notation, the notation $B_{D,1}$ may be introduced to represent the grid of DFT bins corresponding to $b_{D,1}[i]$. In this case, the Relationship (13) may then simply be written as Equation (14):

$$B_{D,1} = \text{Grid}[D, KF] \quad (14)$$

A second set of IF frequencies that occur when mixing a grid are the image mixing products $f_{D,-1}[i]$ corresponding to high-side mixing. The image mixing products $f_{D,-1}[i]$ are given by subtracting f[1,i] from $f_{LO}$. The corresponding DFT bins are given by Equation (15):

$$B_{D,-1} = \text{Grid}[KF-D, KF] \quad (15)$$

Potential interference from the harmonics of the IF signal must also be avoided. Some DUTs will generate harmonic responses, which need to be avoided so that the IF frequencies corresponding to these harmonics correspond to the IF frequencies of the fundamental components. For example, the PNA-X mixer, available from Keysight Technologies, Inc., is a harmonic mixer, so it will down-convert the signal harmonics into the IF. Considering the direct mixing products corresponding to harmonic index H, the DFT bins $B_{D,H}[i]$ are given by Equation (16):

$$B_{D,H} = \text{Grid}[HD \bmod KF, KF] \quad (16)$$

The result of $B_{D,H}$ can easily be generalized to the image mixing products. To that end, it is sufficient to use a negative harmonic index H to refer to the image mixing products and a positive harmonic index H to refer to the direct mixing products.

With respect to potential interference of harmonics (both direct and image mixing products) there is also the issue of Nyquist zones of the ADC (141). The anti-alias filters (e.g., first and LPFs 131 and 132) may not be capable of sufficiently filtering out tones that are present in the higher order ADC Nyquist zones. The transfer characteristics of multiple Nyquist zones of an 11 MHz band of a narrowband anti-alias filter and a 38 MHz band of a wideband anti-alias filter are shown in FIGS. 3A and 3B, respectively, for purposes of illustration.

Figure 3A:
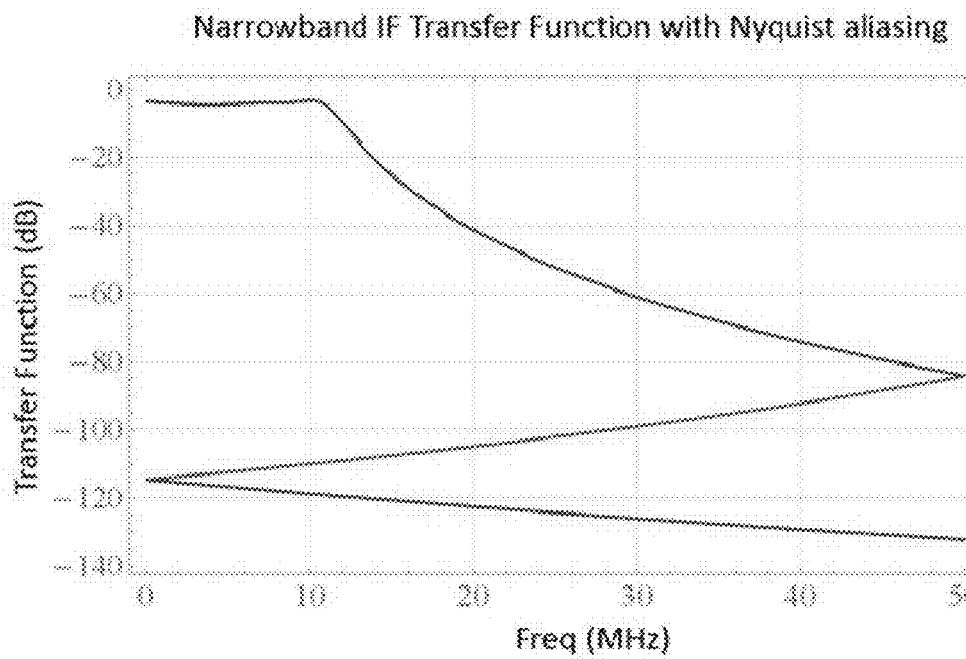
FIG. 3A is a graph depicting a narrowband IF transfer function of Nyquist zones 1, 2 and 3 of an analog to digital converter (ADC) in the receiver system, according to a representative embodiment.
Figure 3B:
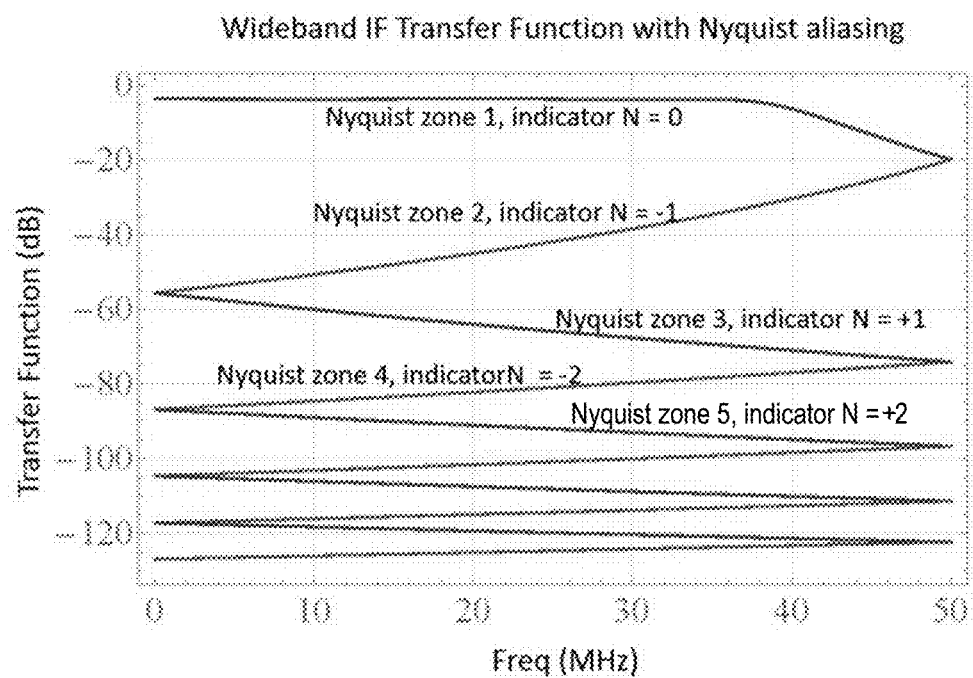
FIG. 3B is a graph depicting a broadband IF transfer function of Nyquist zones 1 through 10 of an ADC in the receiver system, according to a representative embodiment.

In particular, FIG. 3A is a graph depicting a narrowband IF transfer function of Nyquist zones 1, 2 and 3 of the ADC, and FIG. 3B is a graph depicting a wideband (or broadband) IF transfer function of Nyquist zones 1 through 10 of the ADC.

Referring to FIGS. 3A and 3B, in narrowband IF mode, the $2^{nd}$ Nyquist zone is already below −100 dB in the useful 11 MHz part of the IF band. Therefore, no protection against Nyquist aliases is needed. By comparison, in wideband IF mode (which is necessary when the periodically modulated RF signal is a broadband RF signal), 100 dB of Nyquist alias suppression in the useful 38 MHz part of the IF band requires protection up to the $6^{th}$ Nyquist zone. This level of protection can be achieved by first introducing a unique way to indicate each ADC Nyquist zone. That is, rather than using the convention of integer 1 representing the $1^{st}$ Nyquist zone, integer 2 representing the $2^{nd}$ Nyquist zone, and so on, the first Nyquist zone is indicated by N=0, the $2^{nd}$ Nyquist zone is indicated by N=−1, the $3^{rd}$ Nyquist zone is indicated by N=1, the $4^{th}$ Nyquist zone is indicated by N=−2, the $5^{th}$ Nyquist zone is indicated by N=2, and so on, as shown in FIG. 3B.

Using the notation $B_{D,H,N}$ to represent the grid of DFT bins corresponding to harmonic index H and Nyquist zone indicator N, the grid of DFT bins is given by Equations (17) and (18):

for $N \geq 0$:

$$B_{D,H,N} = \text{Grid}[(HD+NLF) \bmod KF, KF] \quad (17)$$

for $N < 0$:

$$B_{D,H,N} = \text{Grid}[(-HD-NLF) \bmod KF, KF] = -\text{Grid}[(HD+NLF) \bmod (-KF), KF] \quad (18)$$

Accordingly, deterministic image rejection may be formulated as follows: Given K and L, determine D and F such that the grid offsets of the DFT bin grids corresponding to the harmonics (H≠1) and higher Nyquist zones (N≠0) different from 0 do not coincide with the grid offset of the Nyquist zone with Nyquist indicator equal to 0 of the directly mixed fundamental (H=1).

Notably, the case where the modulation tone spacing ($f_{MOD}$) is an exact subharmonic of the ADC sampling rate ($f_{ADC}$) corresponds to K=1 raises an issue. In that case, the grid offset of the DFT bins corresponding to the $2^{nd}$ Nyquist zone of the direct mixing products of the fundamental will always coincide with the grid offset of the DFT bins corresponding to the $1^{st}$ Nyquist zone of the direct mixing products of the fundamental. This is demonstrated by evaluating $B_{D,1,0}$ and $B_{D,1,-1}$ for K=1, as shown in Equation (19):

$$B_{D,1,0} = \text{Grid}[D \bmod F, F] \quad (19)$$

$$B_{D,-1,-1} = \text{Grid}[(D+LF) \bmod F, F] = \text{Grid}[D \bmod F, F]$$
$$= B_{D,1,0} \quad (20)$$

In other words, with K=1, $B_{D,1,0}$ and $B_{D,-1,-1}$ correspond to the same grid of DFT bins and will interfere. Accordingly, the case in which the tone spacing $f_{MOD}$ is an exact subharmonic of $f_{ADC}$ should be avoided.

The discussion regarding Equations (17) to (20) is actually a special case of the more general characteristic presented by Equations (21) and (22):

for $N \geq 0, K \geq 0$: $B_{D,H,N} = B_{D,H,N+K}$ \quad (21)

for $N < 0, K \geq 0$: $B_{D,H,N} = B_{D,H,N-K}$ \quad (22)

The proof for the case of $N \geq 0$, $K \geq 0$ is given below by Equations (23) to (24) (The proof for the case of N<0, K≥0 may be similarly derived):

$$B_{D,H,N+K} = \text{Grid}[(HD+(N+K)LF) \bmod KF, KF] \quad (23)$$

$$B_{D,H,N+K} = \text{Grid}[(HD+NLF+L(KF)) \bmod KF, KF] \quad (24)$$

$$B_{D,H,N+K} = \text{Grid}[(HD+NLF) \bmod KF, KF] = B_{D,H,N} \quad (25)$$

Because K and L are relatively prime, as discussed above, there will be no value V smaller than K for which it would be valid that $B_{D,H,N} = B_{D,H,N+V}$. Consequently, interference by ADC Nyquist zones can be minimized by choosing a tone spacing that corresponds to a high number for K (e.g., 11). Generally, as high a number as possible is selected to use as K. The upper limit on the value of K is mainly determined by a limit on the record size R. That is, the higher K, the higher L needs to be for a similar tone spacing, and L is limited by the maximum size of the data record.

Next, potential interference of the harmonic responses is addressed. All harmonic responses will be at an exact DFT bin, but there are only a limited number of DFT bins. Therefore, there will always be a harmonic that has the same DFT bin as the fundamental, and thus will cause interference. However, the effect of this interference may be minimized by the harmonic index at which the same DFT bin corresponds to a harmonic and the fundamental occurs. If the harmonic index at which the same DFT bin corresponds to a harmonic and the fundamental is high enough, the effect of the interference will end up in the noise.

The harmonic index that interferes with the fundamental, denoted G, can be found by prime factorization of KF and D, discussed above. G is equal to the product of all prime factors of KF, none of which are a prime factor of D. As a consequence, interference by harmonic responses can be minimized by making sure that KF and D are relatively prime. A trivial choice for D is 1, for example.

The above maybe proven as follows. G is equal to the smallest integer that satisfies Equation (26):

$$(1+G)D = D + \alpha KF, \quad (26)$$

with $\alpha$ an integer, which is equivalent to:

$$GD = \alpha KF \quad (27)$$

Thus, G is found as the smallest integer solution of Equation (28):

$$G = \frac{\alpha KF}{D}, \text{ with } \alpha \text{ an integer} \quad (28)$$

After prime factorization, with the prime factors indicated by lower case letters with indices, Equation (28) may be written as Equation (29):

$$G = \frac{\alpha k_1 k_2 \ldots f_1 f_2 \ldots}{d_1 f_2 \ldots} \quad (29)$$

The smallest $\alpha$ that will make G an integer number will be equal to the product of all prime factors of D that are not also a prime factor of KF. The end result for G is equal to the product of all prime factors of KF, which are not also a prime factor of D.

At this point, the DFT record size and the LO frequencies have been determined. Therefore, referring again to FIG. 2, the periodically modulated RF signal is received from the DUT (105) at the receiver system (100) in block S215. A complete spectrum of the periodically modulated RF signal is scanned in block S216 by respectively mixing the multiple LO signals at the LO frequencies determined in block S214 with the portions of the periodically modulated RF signal. Multiple LO frequencies are needed when a bandwidth of the periodically modulated RF signal exceeds the available IF bandwidth of the receiver system, as mentioned above. The scanning provides corresponding IF signals having the tones at the same tone spacing as in the periodically modulated RF signal. The mixing operator frequency (LO frequency) shifts the multi-tones such that they end up inside the IF bandwidth. Each of the IF signals are digitized using the ADC (141) in block S217 using the ADC sampling rate.

In block S218, a DFT is performed on the digitized IF signals, respectively, to provide corresponding DFT data records including multiple DFT bins. The DFT is applied, in part, to determine the amplitudes and phases of all of the tones. Each DFT data record has the DFT record size determined in block S213, where for each of the IF signals, the direct mixing components fall on first DFT bins of the multiple DFT bins and the images fall on second DFT bins of the multiple DFT bins in the corresponding DFT data record. The first DFT bins are selected in block, and the second DFT bins are discarded in block S219 in each of the corresponding DFT data records. There may be images that do not fall on second DFT bins, in which case these images are not discarded and add to the noise. However, the number of images that do not fall on second DFT may be reduced or minimized by making sure that KF and D are relatively prime and that K is high, for example, as discussed above.

When a bandwidth of the periodically modulated RF signal exceeds the available IF bandwidth of the receiver system, spectral stitching is performed on the selected first DFT bins in block S220. The spectral stitching enables signal data from the entire bandwidth of the periodically modulated signal to be output and/or displayed. In addition, an inverse DFT may be performed on the spectrally stitched DFT bins to provide a complete IF signal, corresponding to the periodically modulated RF signal, with substantially no interfering images.

For purposes of illustration, examples of implementing various embodiments of the disclosure is provided below, with reference to FIGS. 4A, 4B and 5. The example involves measurement of a periodically modulated RF signal using an IF bandwidth less than 1 kHz (which is determined by the noise floor) and a required tone spacing of approximately 10 kHz. Also, it is assumed the LPF (131) has a 38 MHz bandwidth, which requires protection up to the 5$^{th}$ Nyquist zone. Referring to FIG. 3B, the 5$^{th}$ Nyquist zone (i.e., Nyquist zone 5) corresponds to a Nyquist zone indicator N=+2, which implies that K≥3 is needed. In the exampled, K=3 is selected, and L can now be determined in accordance with Equation (30):

$$L \approx K \frac{f_{ADC}}{f_{MOD}} = 3 \frac{100 \text{ MHz}}{10 \text{ kHz}} = 30000 \quad (30)$$

Notably, L equal to 30000 is not acceptable since it contains the prime factor 3, so a number for L is selected that is the closest number with prime factors 2, 5, 7, 11 and 13, for example. This number is L=30184. The oversampling factor F is chosen to equal 4. Thus, the settings for processing the periodically modulated RF signal are as follows, based on the equations set forth above:

$K = 3$ $L = 30184$ $F = 4$ $R = 120736$ $$f_{RES} = \frac{100 \text{ MHz}}{120736} \approx 828.253 \text{ Hz}$$

$$f_{MOD} = \frac{3}{30184} 100 \text{ MHz} \approx 9939.04 \text{ Hz}$$

Figures 4, 5A, 5B:
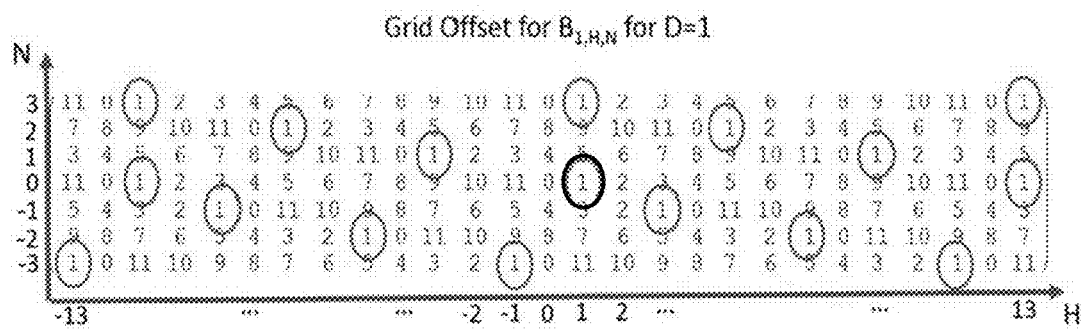
FIG. 4 is a table of grid offsets for DFT bins $B_{1,H,N}$ up to the $13^{th}$ harmonic and up to Nyquist zone indicator 3, where D=1, according to a representative embodiment.
FIG. 5A is a graph providing a simplified visual aid representing the structure of the grid offsets and interferers for DFT bins $B_{1,H,N}$, where D=1, according to a representative embodiment.
FIG. 5B is a graph providing a simplified visual aid representing the structure of the grid offsets and interferers for DFT bins $B_{1,H,N}$, where D=5, according to a representative embodiment.

Next, a value of D must be selected that will enable calculation the LO frequencies. In order to maximally protect against harmonic images, D should not contain the prime factors 2 and 3 because KF and D need to be relatively prime, as discussed above, so D cannot contain any of the prime factors of KF=12 (and the prime factors of 12 are 2 and 3). The value of D may be selected empirically, for example, starting with the case of D=1. FIG. 4 is a table of grid offsets for the DFT bins $B_{1,H,N}$ up to the 13$^{th}$ harmonic and up to Nyquist zone indicator 3, where D=1.

Referring to FIG. 4, the grid offset for the main signal or the fundamental (H=1, N=0), indicated by the bold circle, is equals to 1. The grid offsets for the other components range between 0 and 11. Interference will occur when the grid offset for a particular H and a particular N corresponds to the grid offset for H=1, N=0. These locations are indicated by additional (non-bold) circles.

FIG. 5A is a graph providing a simplified visual aid representing the structure of the grid offsets and the interferers for the DFT bins $B_{1,H,N}$, where D=1 (which are the same factors used to produce the table of grid offsets in FIG. 4). Referring to FIG. 5A, the gray level indicates the grid offset, the dotted triangle indicates the location of the fundamental (H=1, N=0), and the hashed triangles indicate interferers. Notably, the $1^{st}$ Nyquist zone of the $-11^{th}$ harmonic (H=-11, N=0) will interfere. Also, interference will occur due to the $7^{th}$ Nyquist zone of the fundamental (H=1, N=3) and due to the $6^{th}$ Nyquist zone of the image of the fundamental (H=-1, N=-3). The largest potential interferer, though, is likely the $2^{nd}$ Nyquist zone of the $3^{rd}$ harmonic (H=3, N=-1), as it is closest to the fundamental (H=1, N=0). If the interference of the $2^{nd}$ Nyquist zone of the $3^{rd}$ harmonic is an issue, other values for D should be selected and tested.

For example, FIG. 5B is a graph providing a simplified visual aid representing the structure of the grid offsets and the interferers for the DFT bins $B_{1,H,N}$, where D=5 (as opposed to D=1, discussed above with reference to FIG. 5A). Referring to FIG. 5B, the largest potential interferer is likely the $4^{th}$ Nyquist zone of the $3^{rd}$ harmonic (H=3, N=-2). However, as can be determined from FIG. 3B, the $4^{th}$ Nyquist zone offers about 80 dB suppression, while the $2^{nd}$ Nyquist zone offers only about 40 dB suppression. By relative comparison, the $4^{th}$ Nyquist zone offers about 40 dB of additional suppression than the $2^{nd}$ Nyquist zone, so the largest potential interferer using D=5 is significantly more suppressed, and is therefore preferable to using D=1. Other values of D may be selected tested in the same manner to determine the best protection from image interference.

The various embodiments described herein provide a number of advantages. For example, the system and method reduce or substantially eliminate interference caused by images that result from mixing an input RF signal with one or more LO signals, without using image filters. Also, the system and method are flexible, in that the level of protection from image interference may be adjusted, for example, by specifying the number of Nyquist zones of an ADC and/or the number of harmonics of the periodically modulated RF signal to be considered when eliminating interference by the images, and/or by increasing or decreasing the DFT record size to provide more or fewer DFT bins to correspond to the images (and thus discarded).

Also, the various embodiments may be used to perform precise measurements of broadband periodically modulated signals. Interference due to spurious mixing products, in particular harmonics and images (low-side and high-side LO) may be avoided, as well as all of the different Nyquist zones of these components. The amount of interference is predictable and can be calculated. Thus, by properly choosing modulation repetition rate, DFT record size and LO frequencies, interference from images and harmonics can be minimized.

Notably, the various embodiments apply to multiple channel receivers, which enable coherent measurement of a multitude of signals. So, for example, in addition measuring the modulated output signal of a power amplifier, the input signal (i.e., the RF stimulus signal) may also be measured. Further, using a five-channel receiver, for example, all incident and reflected waves that are present at both input and output ports of the power amplifier may be measured in the same manner.

One of ordinary skill in the art appreciates that many variations that are in accordance with the present teachings are possible and remain within the scope of the appended claims. These and other variations would become clear to one of ordinary skill in the art after inspection of the specification, drawings and claims herein. The invention therefore is not to be restricted except within the spirit and scope of the appended claims.

What is claimed is:

1. A method for substantially preventing interference caused by images resulting from mixing an incoming periodically modulated radio frequency (RF) signal with a plurality of local oscillator (LO) signals generated by a local oscillator (LO) in a receiver system, the method comprising:
determining tone frequencies of a plurality of tones and determining tone spacing between adjacent tones of the plurality of tones in the periodically modulated RF signal using a known period of modulation of the periodically modulated RF signal;
identifying a sampling rate of an analog to digital converter (ADC) of the receiver system;
determining a discrete Fourier transform (DFT) record size of samples of the periodically modulated RF signal provided by the ADC based on at least the tone spacing of the plurality of tones in the periodically modulated RF signal and the ADC sampling rate; and
determining LO frequencies of the plurality of LO signals based on at least the DFT record size, the ADC sampling rate and the tone frequencies of the plurality of tones in the periodically modulated RF signal, such that images created by respectively mixing the determined LO frequencies with portions of the periodically modulated RF signal avoid interfering with direct mixing components of the plurality of tones.

2. The method of claim 1, further comprising:
receiving the periodically modulated RF signal at the receiver system;
scanning a complete spectrum of the periodically modulated RF signal by respectively mixing the plurality of LO signals at the determined LO frequencies with the portions of the periodically modulated RF signal to provide corresponding intermediate frequency (IF) signals having the plurality of tones at the same tone spacing as in the periodically modulated RF signal;
digitizing each of the IF signals using the ADC;
performing DFTs on the digitized IF signals, respectively, to provide corresponding DFT data records comprising a plurality of DFT bins, each DFT data record having the determined DFT record size, wherein for each of the IF signals, the direct mixing components fall on first DFT bins of the plurality of DFT bins and the images fall on second DFT bins of the plurality of DFT bins in the corresponding DFT data record;
selecting the first DFT bins and discarding the second DFT bins in each of the corresponding DFT data records; and
spectrally stitching the selected first DFT bins from the corresponding sets of DFT bins.

3. The method of claim 2, further comprising:
performing inverse DFT on the spectrally stitched DFT bins to provide a complete IF signal, corresponding to the periodically modulated RF signal, with substantially no interfering images.

4. The method of claim 1, wherein determining the DFT record size is further based on a desired level of protection from interference caused by images, and
wherein a higher desired level of protection results in a larger DFT record size, and less interference caused by the images created by the mixing of the determined LO frequencies with the portions of the periodically modulated RF signal.

5. The method of claim 4, wherein the desired level of protection is based, in part, on limiting a number of Nyquist zones of the ADC and/or a number of harmonics of the periodically modulated RF signal considered when determining interference by the images resulting from the mixing of the determined LO frequencies with the portions of the periodically modulated RF signal.

6. The method of claim 1, wherein the determined LO frequencies result in the direct mixing components corresponding to a first set of DFT bins and the images created by the mixing corresponding to a second set of DFT bins, which are discarded.

7. The method of claim 1, wherein the DFT record size has no prime factors other than factors of a predetermined set of prime numbers.

8. The method of claim 1, wherein determining the tone spacing between adjacent tones of the plurality of tones comprises using only tone spacings that are equal to the sampling rate of the ADC multiplied by a rational number.

9. The method of claim 8, wherein the rational number is represented by a fraction, and
wherein a numerator and a denominator of the fraction are relatively prime, and the numerator of the fraction is not equal to 1.

10. The method of claim 9, wherein the DFT record size is equal to the denominator of the fraction representing the rational number multiplied by an oversampling factor, the oversampling factor providing additional DFT bins in each DFT data record.

11. The method of claim 10, wherein a DFT frequency resolution of each of the DFT data records is equal to the sampling rate of the ADC divided by the DFT record size.

12. The method of claim 11, wherein determining LO frequencies of the plurality of LO signals comprises:
determining a grid offset factor, the grid offset factor indicating an amount of offset of LO frequencies and a uniform grid of RF frequencies of the periodically modulated RF signal; and
determining each LO frequency by subtracting a product of the grid offset factor and the DFT frequency resolution from each tone frequency of the plurality of tones, respectively.

13. A method for reducing interference while frequency converting a periodically modulated radio frequency (RF) signal received by a receiver system to a plurality of intermediate frequency (IF) signals, the receiver system comprising a local oscillator (LO) for generating a plurality of LO signals to mix with portions of the periodically modulated RF signal to provide the plurality of IF signals, an analog to digital converter (ADC) having a predetermined ADC sampling rate for digitizing the plurality of IF signals, and a domain converter for performing discrete Fourier transforms (DFTs) on the digitized IF signals to provide DFT data records corresponding to each of the digitized IF signals, the method comprising:
identifying tone frequencies of a plurality of tones, determining a required minimum tone spacing between adjacent tones of the plurality of tones in the periodically modulated RF signal using a priori information regarding a period of modulation, and determining a DFT record size of the DFT data records, based on the ADC sampling rate and the required minimum tone spacing, suitable for providing a desired level of protection from image interference;
determining an improved tone spacing based on the suitable DFT record size; and
determining LO frequencies of the plurality of LO signals based on at least the improved tone spacing, the ADC sampling rate and the tone frequencies, such that, when the plurality of LO signals having the determined LO frequencies are respectively mixed with the portions of the periodically modulated RF signal, tones in the IF signals corresponding to the plurality of tones in the periodically modulated RF signal fall on first DFT bins of the corresponding DFT data records and images created by the mixing fall on second DFT bins of the corresponding DFT data records, the second DFT bins being discarded to substantially prevent the images from interfering with the tones in the IF signals.

14. The method of claim 13, further comprising:
receiving the periodically modulated RF signal;
scanning a complete spectrum of the periodically modulated RF signal by respectively mixing the plurality of LO signals at the determined LO frequencies with the portions of the periodically modulated RF signal to provide the corresponding IF signals having the plurality of tones at the same tone spacing as in the periodically modulated RF signal;
digitizing each of the IF signals using the ADC;
performing DFTs on the digitized IF signals, respectively, to provide corresponding DFT data records comprising a plurality of DFT bins, each DFT data record having the determined DFT record size, wherein for each of the IF signals, the direct mixing components fall on the first DFT bins and the images fall on the second DFT in the corresponding DFT data record;
selecting the first DFT bins and discarding the second DFT bins in each of the corresponding DFT data records; and
spectrally stitching the selected first DFT bins from the corresponding sets of DFT bins.

15. The method of claim 13, wherein the desired amount of interference reduction is based, in part, on limiting a number of Nyquist zones of the ADC and/or a number of harmonics of the periodically modulated RF signal considered when determining interference by the images resulting from the mixing of the determined LO frequencies with the portions of the periodically modulated RF signal.

16. A system for acquiring a periodically modulated radio frequency (RF) signal with reduced interference caused by images, the system comprising:
a local oscillator (LO) for generating a plurality of LO signals;
a mixer for receiving the periodically modulated RF signal and for mixing portions of the periodically modulated RF signal with the plurality of LO signals, respectively, to provide a plurality of intermediate frequency (IF) signals;
an analog to digital converter (ADC) for digitizing the plurality of IF signals, the ADC having a predetermined ADC sampling rate; and
a processing unit for processing the digitized IF signals, the processing unit being configured to execute instructions stored on a non-transitory computer readable medium, causing the processing unit to:
perform discrete Fourier transforms (DFTs) on the digitized IF signals to provide DFT data records respectively corresponding to the digitized IF signals;

receive tone frequencies of a plurality of tones and tone spacing between adjacent tones of the plurality of tones in the periodically modulated RF signal using a priori information;

determine a DFT record size of the DFT data records based on at least the tone spacing, the ADC sampling rate, and a desired amount of interference reduction; and determine LO frequencies of the plurality of LO signals based on at least the DFT record size, the ADC sampling rate and the tone frequencies, such that, when the plurality of LO signals having the determined LO frequencies are respectively mixed with the portions of the periodically modulated RF signal, tones in the IF signals corresponding to the plurality of tones in the periodically modulated RF signal fall on first DFT bins of the corresponding DFT data records and images created by mixing the plurality of LO signals with the portions of the periodically modulated RF signal, respectively, fall on second DFT bins of the corresponding DFT data records, wherein the LO generates the plurality of LO signals having the determined LO frequencies, wherein the mixer mixes the generated plurality of LO signals with portions of the received periodically modulated RF signal, respectively, to provide the plurality of IF signals, wherein the tones of each IF signal fall on first DFT bins of the corresponding DFT data record and the images of each IF signal fall on second DFT bins of the corresponding DFT data record, and wherein the processing unit discards the second DFT bins, substantially preventing the images from interfering with the tones in the first DFT bins, and spectrally stitches the first DFT bins of each IF signal to provide data corresponding to the periodically modulated RF signal.

17. The system of claim 16, wherein the periodically modulated RF signal is received from a device under test (DUT), output by the DUT in response to an excitation signal generated by a signal generator, the excitation signal having the same tone frequencies and tone spacing between adjacent tones as the plurality of tones in the periodically modulated RF signal.

18. The system of claim 17, wherein the using a priori information includes the tone frequencies and tone spacing between adjacent tones of the excitation signal.

* * * * *